United States Patent
Pereira et al.

(10) Patent No.: US 9,564,135 B2
(45) Date of Patent: *Feb. 7, 2017

(54) AUDIO DECELERATION

(71) Applicant: Sony Interactive Entertainment America LLC, San Mateo, CA (US)

(72) Inventors: Rui Filipe Andrade Pereira, Aliso Viejo, CA (US); Andrew Buchanan Gault, San Francisco, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/218,317

(22) Filed: Mar. 18, 2014

(65) Prior Publication Data

US 2014/0207474 A1  Jul. 24, 2014

Related U.S. Application Data

(63) Continuation of application No. 12/966,145, filed on Dec. 13, 2010, now Pat. No. 8,676,591.

(60) Provisional application No. 61/370,005, filed on Aug. 2, 2010.

(51) Int. Cl.
| | |
|---|---|
| *G10L 21/043* | (2013.01) |
| *G10L 19/00* | (2013.01) |
| *H04N 21/431* | (2011.01) |
| *H04N 21/439* | (2011.01) |
| *H04N 21/442* | (2011.01) |
| *H04N 21/478* | (2011.01) |
| *H04N 21/61* | (2011.01) |

(52) U.S. Cl.
CPC ............ *G10L 19/00* (2013.01); *H04N 21/431* (2013.01); *H04N 21/439* (2013.01); *H04N 21/44209* (2013.01); *H04N 21/4781* (2013.01); *H04N 21/6125* (2013.01)

(58) Field of Classification Search
CPC ............................ H04N 21/431; G10L 21/043
USPC ........................................................ 704/500
See application file for complete search history.

(56) References Cited

U.S. PATENT DOCUMENTS

| | | | |
|---|---|---|---|
| 5,734,231 A * | 3/1998 | Lee ...................... | H05B 41/046 |
| | | | 315/106 |
| 6,377,931 B1 * | 4/2002 | Shlomot ................. | G10L 21/04 |
| | | | 369/44.32 |
| 8,560,331 B1 * | 10/2013 | Pereira ................. | H04N 21/431 |
| | | | 704/503 |
| 8,676,591 B1 * | 3/2014 | Pereira ................. | H04N 21/431 |
| | | | 704/500 |

* cited by examiner

*Primary Examiner* — Susan McFadden
(74) *Attorney, Agent, or Firm* — Martine Penilla Group, LLP (57) ABSTRACT

An audio receiving system includes logic configured to reduce the accumulation of delays caused by the late arrival of audio packets. This logic is configured to accelerate or decelerate presentation of a resulting audio stream in response to the detection of late packets. The acceleration is discontinued once the effects of the late packets have been compensated for. The audio receiving system is typically applied to applications in which lag is undesirable. These can include web conferencing, telepresence, and online video games.

13 Claims, 3 Drawing Sheets

AUDIO DECELERATION

CLAIM OF PRIORITY

This application is a continuation of U.S. patent application Ser. No. 12/966,145, filed on Dec. 3, 2010, and entitled "Audio Deceleration", now issued as U.S. Pat. No. 8,676,591, which claims priority to U.S. Provisional Patent Application Ser. No. 61/370,005 filed Aug. 2, 2010 and entitled "Audio Acceleration and Deceleration."

CROSS-REFERENCE TO RELATED APPLICATIONS

This application is related to U.S. patent application Ser. No. 12/826,130 filed Jun. 29, 2010 and entitled "Video Game Overlay," and U.S. patent application Ser. No. 12/826,489 filed Jun. 29, 2010 and entitled "Voice Overlay." The disclosures of the above provisional and non-provisional patent applications are hereby incorporated herein by reference.

BACKGROUND

1. Field of the Invention

The invention is in the field of audio communications and specifically in the field of audio processing over networks where packets may be delayed.

2. Related Art

Audio data communicated over networks, such as the Internet, is typically communicated as a sequential series of packets. Each packet includes the audio data, sequence information, destination information, etc. according to a standard such as TCP/IP. The packets are sent from a source to a receiver. Typically, the receiver includes a receive buffer with a limited capacity. A feedback loop is sometimes used to limit sending of packets from the source to times when space is available in the receive buffer. At the receiver, the audio data is assembled into an audio stream according to the sequence identification in each packet. This audio stream is typically presented to a user of the receiver in real time. The user is a person listening to the audio stream.

When using unpredictable networks, such as the internet, there is a possibility that a packet is received late. As used herein, the phrases "received late" and "late packet" are meant to characterize a packet that is received too late for the audio data within the packet to be seamlessly used in the audio stream. For a late packet the timing of the packet's receipt results in a gap or delay in the audio stream. This gap may be so small, e.g., on the order of a few microseconds, that it does not significantly affect the audio as perceived by the user. Or this gap may be long enough for the user to hear a disruption of the audio stream. In either case, when a packet arrives late, that part of the audio stream derived from audio data within the late audio packet both starts and finishes later than it would have if the packet had not been late.

The problems caused by late packets can be problematic in systems in which it is important that the audio stream be presented as quickly as possible to the user. These systems include, for example, web conferencing, telepresence, and streamed video gaming. In each of these systems it is desirable to minimize the lag time between when an event occurs at the audio receiver, audio data generation at the audio source that is dependent on this event, and/or presentation of the generated audio data to a user at the receiver. For example, in online video games, in which the game audio is generated at a remote game server and delivered to a client, the event may be receipt of a game command to shoot a gun. This game command is communicated from the client to the game server. At the game server audio, e.g., the sound of a gunshot, is generated and sent back to the client in data packets. At the client the audio data within the packets are assembled into an audio stream and presented to a user. It is desirable for the user's hearing of the gunshot to be as close as possible in time to the entry of the command to shoot. In order to minimize this time lag the receive buffer on the client is typically kept to a minimum size so that audio data is not stored in this buffer for too long. Unfortunately, the small receive buffer increases the probability that a delayed packet will result in an interruption of the resulting audio stream. Some modification of audio frequency has been performed in the prior art. See, for example, www.screemingbee.com. However, such systems change the frequency of sound without changing the time in which it takes to present.

SUMMARY

Some embodiments of the invention include systems and methods of reducing delays in the presentation of an audio stream that result from late arriving audio packets. Delays are reduced by accelerating the presentation of audio to a user after a late packet arrives. The acceleration includes presenting the audio more quickly than would otherwise occur. The acceleration is optionally performed in a stepwise manner so that abrupt changes in presentation rate are not perceived by the user.

The reduction in presentation delay is optionally applied to game audio received over a communication network from remote video game server. Such game systems inherently have a lag between the time a game player enters a game command on a client and a sound resulting from that game command is presented to the game player. Any delay in presentation of the audio to the game layer contributes to the this undesirable lag. As used herein, the term "game player" is used to refer to a person that plays a game and the term "game playing device" is used to refer to a device used to play a game.

The reduction in presentation delay may be applied to any system in which lag is undesirable, such as web conferencing and telepresence.

Various embodiments of the invention include an audio system comprising an input configured to receive audio packets via a communication network; audio monitoring logic configured to determine that one of the audio packets was late; audio decoding logic configured to convert the audio packets to an audio stream; audio processing logic configured to accelerate presentation of part of the audio stream to a user such that delay in the presentation of the audio stream is reduced; and an audio output configured for presenting the audio stream to the user.

Various embodiments of the invention include a method of communicating audio packets, the method comprising providing a computing instructions to a client over a communication network, the computing instructions being configured to: detect that a first audio packet was received late by the client, and accelerate a rate at which an audio stream is presented to a user based on the first audio packet being received late; and providing a series of audio packets to the client over the communication network, the series of audio packets including the first audio packet and being configured to be decoded to the audio stream.

Various embodiments of the invention include a method of processing audio packets, the method comprising receiving a first audio packet via a communication network; detecting that the first audio packet was received late; converting the first audio packet to part of an audio stream; accelerating a rate at which the audio stream is presented to a user based on the first audio packet being received late; and presenting the audio stream to the user at the accelerated rate.

Various embodiments of the invention include an audio system comprising an input configured to receive audio packets via a communication network; audio monitoring logic configured to anticipate that one of the audio packets will be late; audio decoding logic configured to convert the audio packets to an audio stream; audio processing logic configured to decelerate a presentation rate of part of the audio stream to a user such that a potential gap in the audio stream resulting from late receipt of one of the audio packets is reduced or eliminated; and an audio output configured for presenting the audio stream to the user at the decelerated presentation rate.

Various embodiments of the invention include a method of processing audio packets, the method comprising receiving a first audio packet via a communication network; converting the first audio packet to part of an audio stream; anticipating that a second audio packet will be received late and thereby cause a gap in the audio stream; decelerating a rate at which the part of the audio stream is presented to a user based on the anticipation that the second audio packet; and presenting the first audio packet to the user at the decelerated rate.

Various embodiments of the invention include a method of communicating audio packets, the method comprising providing a computing instructions to a client over a communication network, the computing instructions being configured to: anticipate that a second audio packet will be received late at the client and thereby cause a gap in an audio stream, and decelerate a rate at which audio data received in a first audio packet is presented to a user based on the anticipation that the second audio packet will be late; and providing a series of audio packets to the client over the communication network, the series of audio packets including the first audio packet and the second audio packet, and being configured to be decoded to the audio stream.

DETAILED DESCRIPTION

In systems where minimal lag is important, such as web conferencing, telepresence, and remotely played video games, momentary disruption of an audio stream is not the only problem that can be caused by late packets. Presentation to the user of that part of the audio stream generated from the late audio packet is started later than it otherwise would be. If that part of the audio stream is presented to the user as it was intended, e.g., 25 millisecond of audio stream would be intended to take 25 milliseconds to present, the presentation of that part of the audio stream would also end later than would be expected. The next part of the audio stream (resulting from the next audio packet in sequence) can only be presented after the prior part of the audio stream is finished. A part of an audio stream that ends later because of a packet that is received late, therefore, causes the next and subsequent parts of the audio stream to start late.

Delays in the presentation of an audio stream, as caused by late packets, contribute to the undesirable lag between events and resulting presentation of the audio stream. While individual delays of a few milliseconds can be somewhat manageable, the delay resulting from one late pack is added to the delay resulting from another late packet. Small delays, thus, accumulate into larger delays. These larger delays significantly increase lag.

Figure 1:
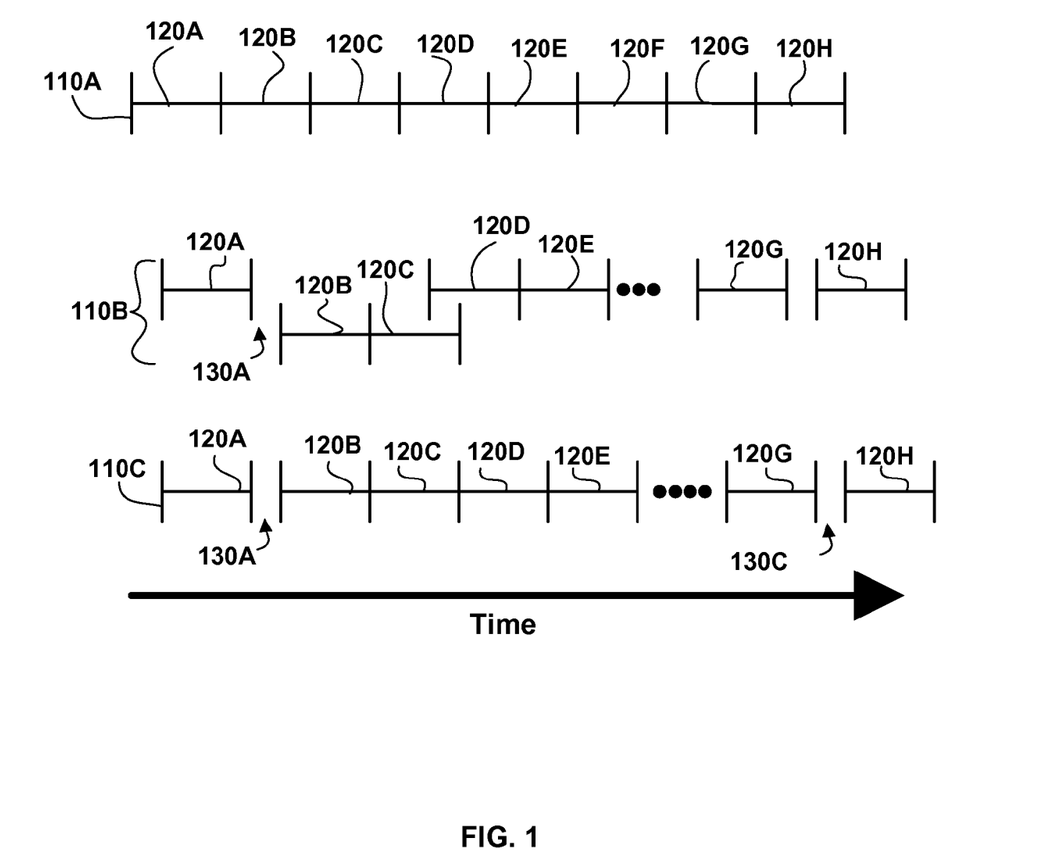
FIG. 1 illustrates how late packets have been found to result in cumulative delay in the presentation of audio packets.

FIG. 1 illustrates how late packets have been found to result in cumulative delay in the presentation of audio packets. FIG. 1 includes three timelines 110, individually labeled 110A, 110B and 110C. Timeline 110A illustrates an audio stream divided into Packets 120, as produced by an audio source at a server. Packets 120 are individually identified as 120A, 120B, 120C, etc. In the audio stream of Timeline 110A the packets are contiguous, without gaps.

Timeline 110B illustrates times at which Packets 120 are received at the client, and Timeline 110C illustrates times at which data from the Packets 120 are presented as an audio stream to a user of the client. Because of variability in the communication channel, some of Packets 120 are received late. For example, Packets 120B and 120C are received late. This results in a Gap 130A in the audio stream as presented to the user. The delay caused by Gap 130AB causes presentation of the audio within Packet 120B to start and end later than it would if Packet 120B had not been late. As a result, presentation of subsequent parts of the audio stream, generated using data from Packets 120C, 120D, 120E etc. all start and end later than they would have if Packet 120B would not have been late. This delay adds to the total lag of the system.

Because each packet takes a predetermined amount of time to present to the user, there is no prior art mechanism by which the delay can be eliminated without disruption of or a break in the audio stream. The delay is maintained for subsequent packets. This delay contributes to a lag in the audio signal.

As shown in Timeline 110C the next packet to be received late is Packet 120H. This late packet results in another delay in the presentation of audio stream to the user. This delay is represented by Gap 130C. The total delay in presentation of the audio to the user is now the sum of Gap 130B and Gap 130C. Even if these gaps are short they can accumulate until the total delay is a significant contribution to the total lag.

Figure 2:
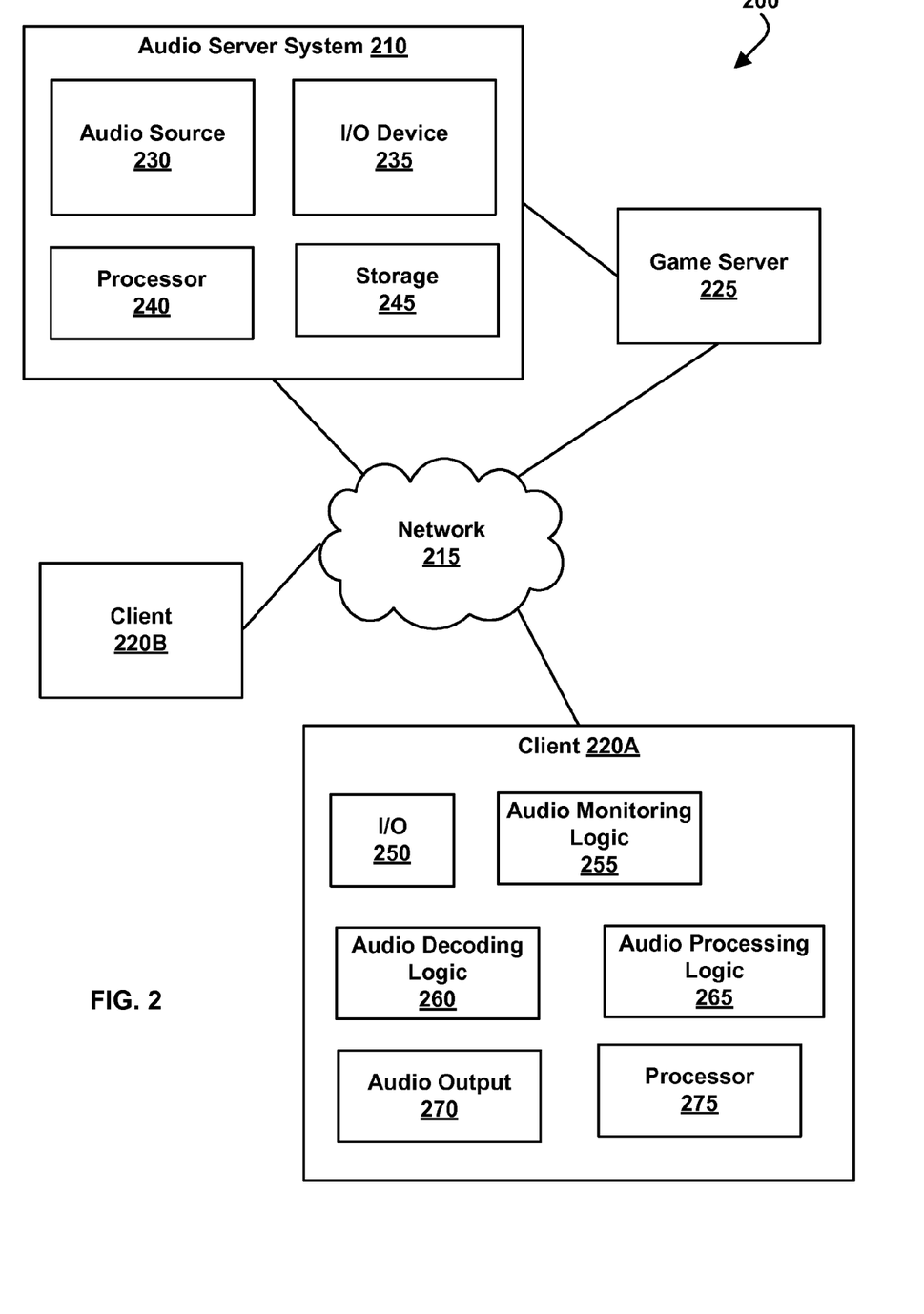
FIG. 2 is an illustration of an audio serving network, according to various embodiments of the invention.

FIG. 2 is an illustration of an Audio Serving Network 200, according to various embodiments of the invention. Audio Serving Network 200 includes one or more Clients 220 configured to receive audio data over a Network 215 from an Audio Server System 210. Audio Serving Network 200 optionally further includes a Game Server 225 configured to maintain a game state of a multi-player video game.

Audio Server System 210 is configured to provide audio data within Packets 120 to one or more of Clients 220 via Network 215. The audio packets are typically generated within Audio Server System 210 using an encoder configured to package audio data according to an encoding standard. Audio Server System 210 includes an Audio Source 230 configured to provide the audio data. For example, Audio Source 230 can include a microphone, sound generation logic, and/or an input configured to receive the audio data from an external source. In some embodiments, Audio Source 230 is configured to receive sound files from a Storage 245. These sound files can include data representing sound effects, music, audio messages, and/or voice data. In some embodiments Audio Source 230 is configured to receive audio data from one or more member of Clients 220, e.g., Client 220B, and provide that audio data to another member of Clients 220, e.g., Client 220A. Audio Source 230 includes hardware, firmware, and/or software stored on a computer readable medium.

Optional Storage 245 is typically a digital storage device such as digital memory, static memory, random access memory, a hard drive, an optical drive, and/or the like. Storage 245 is optionally distributed over several physical devices. Storage 245 is configured (e.g., by way of an appropriate data structure or file system) to store audio streams, audio data and/or audio files. In alternative embodiments, Storage 245 includes an analog storage device. In some embodiments, Storage 245 is configured to store the software components included in other parts of Audio Server system 210 or Client 220A discussed herein.

I/O Device 235 is configured for Audio Server System 210 to send and/or receive information such as audio, video, commands, requests for information, game states, client identities, player identities, game commands, security information, audio, and/or the like. I/O Device 235 typically includes communication hardware such as a network card or modem. I/O Device 235 is configured to communicate with Game Server 225, Network 215, and/or Clients 220.

I/O Device 235 is optionally configured to receive audio signals from a telepresence device such as a robot or remotely controlled vehicle. These telepresence devices may be considered part of Audio Server System 210.

Processor 240 is an electronic and/or optical processor configured to execute logic, e.g. software, included within the various components of Audio Server System 210 discussed herein. For example, Processor 240 may be programmed with software instructions in order to perform the functions of Audio Source 230, Game Server 225, and/or a I/O Device 235. Audio Server System 210 optionally includes more than one instance of Processor 240. Processor 240 may also be programmed with software instructions in order to execute commands received by Audio Server System 210, or to coordinate the operation of the various elements of Audio Serving Network 200 discussed herein. Processor 240 includes one or more hardware device.

Network 215 may be any type of communication network between computing devices including, a telephone network, the Internet, wireless networks, powerline networks, local area networks, wide area networks, private networks, and/or the like. In typical embodiments, the audio streams are communicated via standard protocols, such as TCP/IP or UDP/IP. Alternatively, the audio streams are communicated via proprietary standards.

Optional Game Server 225 is configured to maintain the state of a video game based on inputs from multiple geographically dispersed game players. Game Server 225 may be operated by a different entity than Audio Server System 210. For example, Game Server 225 may be operated by the publisher of a multiplayer game. In this example, Audio Server System 210 is optionally viewed as a client by Game Server 225 and optionally configured to appear from the point of view of Game Server 225 to be a prior art client executing a prior art game engine. Communication between Audio Server System 210 and Game Server 225 optionally occurs via Network 215. As such, Game Server 225 can be a prior art multiplayer game server that sends game state information to multiple clients, one of which is Game Server System 210. Video Server System 210 may be configured to communicate with multiple instances of Game Server 225 at the same time. For example, Audio Server System 210 can be configured to provide audio related to a plurality of different video games to different users. Each of these different video games may be supported by a different Game Server 225 and/or published by different entities. In some embodiments, several geographically distributed instances of Audio Server System 210 are configured to provide game audio to a plurality of different game players. Each of these instances of Audio Server System 210 may be in communication with the same instance of Game Server 225. Communication between Audio Server System 210 and one or more Game Server 225 optionally occurs via a dedicated communication channel. For example, Audio Server System 210 may be connected to Game Server 225 via a high bandwidth channel that is dedicated to communication between these two systems.

Clients 220, referred to herein individually as 220A, 220B, etc., may include, for example, terminals, personal computers, game consoles, tablet computers, telephones, televisions, MP3 players, headphones, stereo systems, set top boxes, kiosks, wireless devices, digital pads, stand-alone devices, handheld game playing devices, and/or the like. Typically, Clients 220 are configured to receive packets including audio data, decode the audio data into audio streams, and present the resulting audio stream to a user, e.g., a player of a game or the controller of a telepresence device. The audio streams may be presented to the user on a sound generation device integral to Client 220 or on a separate device such as headphones, speakers, a stereo, game player, or television. Clients 220 are configured to receive audio streams via Network 215.

A typical example of Clients 220 is a personal computer comprising a processor, non-volatile memory, a display, decoding logic, network communication capabilities, and input devices. The decoding logic may include hardware, firmware, and/or software stored on a computer readable medium. Systems for decoding (and encoding) audio streams are well known in the art and vary depending on the particular encoding scheme used.

Clients 220 may, but are not required to, further include systems configured for modifying received audio. For example, a client may be configured to perform filtering, to overlay one audio stream on another audio stream, and/or the like. A member of Clients 220 is optionally configured to receive more than one audio or video stream. Input devices of Clients 220 may include, for example, a keyboard, a joystick, a pointing device, a force feedback device, a motion and/or location sensing device, a mouse, a touch screen, a neural interface, a camera, input devices yet to be developed, and/or the like.

The number of clients included in Audio Serving Network 200 may vary widely from one or two to thousands, tens of thousands, or more. Further details of Client 220A are illustrated in FIG. 2. Other Clients 220 may include the same or similar features. Client 220A includes an I/O 250 configured for communicating via Network 215, various audio related logic, an Audio Output 270 and a Processor 275. The audio related logic includes Audio Monitoring Logic 255, Audio Decoding Logic 260, and Audio Processing Logic 265. These logic include hardware, firmware and/or software stored on a computer readable medium.

I/O 250 is configured for Client 220A to send and/or receive information such as audio, video, commands, requests for information, game states, client identities, player identities, game commands, security information, and/or the like. I/O 250 typically includes communication hardware such as a network card or modem, and is configured to communicate audio data using audio packets. In some embodiments, I/O 250 includes an Ethernet port. I/O 250 is configured to communicate with Game Server 225, Network 215, and/or Audio Server System 210.

Audio Monitoring Logic 255 is configured to monitor the receipt of audio packets and to determine that (if) one of the audio packets was received late, if this occurs. Audio Monitoring Logic 255 may operate by looking for gaps in an audio stream generated by Audio Decoding Logic 260, by monitoring times at which audio packets are received by I/O 250, by monitoring how many audio packets are in a receive buffer, by monitoring operation of Audio Decoding Logic 260, and/or the like. Audio Monitoring Logic 255 optionally uses a clock signal generated within Client 220A. When a late packet occurs, Audio Monitoring Logic 255 is configured to provide notice to Audio Processing Logic 265 of a late packet event. This notice optionally includes an amount of time that the packet was late, a number of late packets, a total time of delayed packets. In various embodiments, each of the late packets detected by Audio Monitoring Logic 255 can be at least 0.5, 1, 5, 10, 50 or 100 milliseconds late.

In some embodiments, Audio Monitoring Logic 255 is also configured to provide notice of late packets, and/or statistics regarding late packets to Audio Server System 210. This information can be used to characterize the reliability of a communication channel between Audio Source 230 and Client 220A. In some embodiments, Audio Monitoring Logic 255 is configured to detect if packets are received out of sequence and treat a packet received out of sequence as being late.

Audio Decoding Logic 260 is configured to convert audio packets into an audio stream that can be presented to a game player. Audio Decoding Logic 260 can include any decoder for decoding audio, including those presently well known in the art. Audio Decoding Logic 260 optionally includes systems and methods configured for filling gaps in an audio stream. For example, techniques know as error concealment may be used to fill gaps in the audio stream.

Audio Processing Logic 265 is configured to accelerate and/or decelerate presentation of the audio stream generated by Audio Decoding Logic 260 to a user. When presentation of the audio stream is accelerated the audio stream is presented to a game player in a shorter time than it would be if it were not accelerated. By presenting the audio stream in a shorter time, accumulated delay is reduced. Typically, the audio stream is accelerated when there is a delay in presentation of the audio stream and then decelerated (e.g., to normal speed) once the delay is reduced or eliminated.

The acceleration of audio presentation is optionally performed by sampling the audio data at a higher frequency than would otherwise occur. For example, audio data that was generated to be presented at 44 k samples/second may be sampled at 44.2 k samples/second to achieve a 0.5 percent acceleration. The higher sampling frequency may occur in a device driver, or in a sound card of Client 220A. The higher sampling frequency typically results in the audio being presented at a higher pitch. Deceleration of the rate at which audio is presented to a game player can similarly be accomplished by reducing the rate at which the audio data is sampled.

In some embodiments, acceleration of the rate at which audio is presented is accomplished by skipping data. For example, to increase the presentation rate by one percent, one of every one hundred audio samples can be ignored instead of being presented. Methods for compensating for lost data packets and/or gaps, in which artificial audio data are generated, are optionally used to generate the transition data. Examples of these methods are discussed elsewhere herein. Alternatively, parts of the audio stream represented by more than one sample can be skipped to accelerate presentation of the audio stream as a whole. Part of the skipped data is optionally replaced by a smaller set of transition data. The transition data is configured to make the absence of the skipped data less apparent to a game player. Alternatively, when essentially identical adjacent audio data are found, a subset of these audio data may be ignored and not included in the audio stream. Not including these audio data causes the audio stream to be presented in a shorter period of time.

In some embodiments, deceleration of the rate at which audio is presented is accomplished by adding additional data to the audio stream and/or sampling some of the audio data more than once. For example, in order to achieve a 10 percent deceleration every tenth data element may be sampled twice. This results in two copies of the twice sampled data element being presented to the user. Sampling a data element twice can be accomplished by either sampling the same data element two times or by making a copy of the data element and sampling each copy twice. The type and size of a data element is typically dependant on the particular encoding scheme used. In various embodiments, data elements can be at least 2, 48 16, 32 or more bytes in size.

Acceleration and deceleration of audio packet presentation is optionally performed in a stepwise manner. For example, if an acceleration of .about.5 percent is desired this acceleration can be achieved by increasing the rate at which the audio stream is presented in five steps of 1 percent each, or ten steps of 0.5 percent each. By changing the rate at which the audio stream is presented in a series of small steps, the acceleration is less likely to be perceived by the game player relative to making one larger step. In various embodiments the steps are less than or equal to, for example, 0.1, 0.5, 1, 2, 5, or 10 percent. An acceleration of 10 percent means that the time required to present the accelerated part of the audio stream is reduced by 10 percent. The total amount of acceleration or deceleration achieved by a number of steps can be greater than 0.2, 0.5, 1, 2, 3, 5, 10, or 15 percent. Optionally, deceleration is applied more aggressively than acceleration.

Acceleration and deceleration of audio packets are optionally performed between parts of the audio stream generated from different data packets. For example, a change in presentation rate can be applied at the boundary between a part of the audio stream from a first packet and a part of the audio stream from a second packet. In some embodiments, when an audio packet is received late Audio Processing Logic 265 is configured to apply one step of acceleration at a subsequent packet boundary. Further steps of acceleration can be applied at further packet boundaries if needed. The total amount of acceleration can be a function of the total amount of delay resulting from late audio packets, the number of late packets, how late individual packets were received, and/or the like. For example, if the total delay is 200 milliseconds then the total acceleration may be 5 percent, and if the total delay is 100 milliseconds then the total acceleration may be 2.5 percent. Acceleration optionally occurs each time a packet is received late.

Deceleration of the presentation of audio packets to the user occurs when the delay resulting from late packets has been eliminated or reduced to a predetermined threshold. For example, in some embodiments, if a 200 millisecond delay is reduced to 100 milliseconds the acceleration is reduced from 5 percent to 2.5 percent in a stepwise manner. A predetermined threshold is a threshold that is determined any time before the reduction in the delay occurs. Further, the acceleration can be reduced to 1 percent when the total delay reaches 50 milliseconds. This reduction in acceleration is considered an example of deceleration as the terms are used herein.

Deceleration of audio presentation is optionally used to present audio data at a rate that is slower than the audio was originally intended to be presented. For example, audio data that was originally intended to be sampled at 40 k samples/second may be sampled at 39.8 k samples/second to achieve a 5 percent decrease in the presentation rate of the audio data to a user. This decrease will result in an increase of 5 percent in the time over which the audio data will be presented.

In some embodiments, the rate at which audio data is presented is decreased in anticipation of a late packet. This can reduce the lengths of gaps, such as Gaps 130B and 130C (FIG. 1), in presentation of an audio stream. For example, if the presentation time of Packet 120A is increased the length of Gap 130B will be reduced, and may be eliminated.

Anticipation of late packets can occur when, for example, a packet is received out of sequence, the number of packets in a receive buffer of Client 220A drops below a desired level, a predetermined time has passed since a last audio packet has been received, and/or the like. A predetermined amount of time is an amount of time determined any time before the last audio packet is received. Typically audio packets include a sequence identifier. For example, they may be numbered . . . , 5, 6, 7, 8, . . . . If Packet 120D (FIG. 1) is received before Packet 120C, then it can be anticipated that Packet 120C will be received late.

Client 220A may include a receive buffer having slots configured to store 1, 2, 3 or more audio packets. For example, with a two slot buffer, a first audio packet may be being processed (having been retrieved from the buffer), while a second audio packet is stored in a first slot of the receive buffer and the buffer is prepared to receive a next audio packet in a second slot. If the second audio packet is retrieved from the buffer before the next audio packet is received, then it can be anticipated that the next packet will be late. In another example, the receive buffer of Client 220A is configured to store one audio packet. A first audio packet is being processed while a second audio packet is received and stored in the receive buffer. If the processing of the first audio packet is half completed and the second audio packet is not yet received then it can be anticipated that the second audio packet will be late. If the processing of the first audio packet is 80% completed and the second audio packet is not yet received then there is an even greater probability that the second audio packet will be late.

The mechanisms used to anticipate that an audio packet will be late are optionally dependant on a history of the communication stream. For example, the probability that an audio packet will be late if the audio packet is not received by a certain time may be calculated based on the statistics of previously received packets. As these statistics can change with factors such as different communication channels, different times of day, different quality of service requirements, etc. The anticipation of whether an audio packet will be late can be calculated based on these factors.

As discussed elsewhere herein, deceleration of audio presentation may be performed in a stepwise manner. For example further steps in deceleration may be applied as it becomes more likely that a packet will be received late. In some embodiments, if no packets are received for 30 milliseconds then presentation is decelerated a first step and if packets still have not been received after 40 milliseconds then presentation is decelerated a second step, etc.

In some embodiments, gaps in an audio stream, such as Gap 130C, can be at least partially concealed or otherwise compensated for by filling the gap with filler sound generated on Client 220A. This generated filler sound can be white noise, white noise with lower intensity at higher frequencies relative to lower frequencies, continuation of a previous waveform, and/or the like. The generated filler sound is optionally dependant on the last sound of the audio stream prior to the gap. For example, the spectrum of the generated filler sound can be dependent on the frequencies of this last sound, or the generated sound can be a reverb of the last sound.

When a late audio packet is anticipated, the generated filler sound is optionally faded into the audio stream presented to the user prior to the beginning of the gap. For example, in some embodiments, 33 millisecond before an anticipated gap the generated filler sound is overlaid on the audio track. The intensity (volume) of the overlaid filler sound is optionally increased over the 33 milliseconds before the gap. If the gap actually occurs then the generated filler sound is used to fill the gap. If the gap does not occur, or when the gap ends, then the filler sound is faded away. For example, when the gap ends the generated filler sound is optionally applied as an overlay to the audio stream following the gap, with a gradually reduction in intensity. Fading the generated filler sound in and out smoothes the transitions between the presentation of audio stream received by Client 220A and the filler sound generated on Client 220A. The filler sound is optionally generated by Audio Monitoring Logic 255 or Audio Decoding Logic 260.

Audio Output 270 is configured for presenting the audio stream to the user. Audio Output 270 can include a sound card, a digital to analog converter, an amplifier, an audio jack, speakers, headphones, a wireless transmitter, and/or the like. For example, in some embodiments, Audio Output 270 includes a sound card and speakers attached to a personal computer.

Processor 275 is an electronic and/or optical processor configured to execute logic, e.g. software, included within the various components of Client 220A as discussed herein. For example, Processor 275 may be programmed with software instructions in order to perform the functions of Audio Monitoring Logic 255, Audio Decoding Logic 260, and/or Audio Processing Logic 265. Processor 275 may also be programmed with software instructions in order to execute commands or process data received by Client 220A. Client 220A optionally includes more than one instance of Processor 275. Processor 275 includes one or more hardware device.

Figure 3:
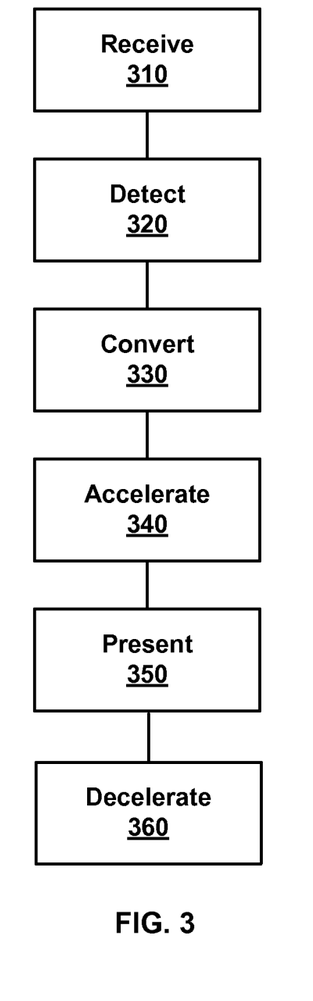
FIG. 3 illustrates methods of processing audio, according to various embodiments of the invention.

FIG. 3 illustrates methods of processing audio, according to various embodiments of the invention. In these methods the receipt of a late audio packet is detected, the presentation of one or more audio packets is accelerated in response to this detection, and the one or more audio packets are presented to a user. The acceleration of the one or more accelerated audio packets can compensate for a cumulative delay in the presentation of an audio stream that results from one or more late packets.

More specifically, in a Receive Step 310 a first audio packet, e.g., Packet 120A, is received at Client 220A via Network 215 using I/O 250. This first audio packet is any one in a series of audio packets provided to Client 220A. The series of audio packets is configured to be converted to an audio stream and presented to a user. The first audio packet is typically received from Audio Server System 210. In some embodiments, the first audio packet includes game audio generated by Audio Source 230 based on game rules and/or events within a video game. In some embodiments, the first audio packet includes audio generated at a telepresence device.

In a Detect Step 320, Audio Monitoring Logic 255 is used to detect that the first audio packet was received late. As described elsewhere herein, detection can occur by looking for gaps in an audio stream generated by Audio Decoding Logic 260, by monitoring times at which audio packets are received by I/O 250, by monitoring space available in a receive buffer, by monitoring operation of Audio Decoding Logic 260, and/or the like. Detection of a late audio packet results in a message to Audio Processing Logic 265 configured to signal that a packet was late. This massage can include the information discussed elsewhere herein.

In a Convert Step 330 Audio Decoding Logic 260 is used to convert the first audio packet to part of an audio stream. This conversion is optionally performed in accordance with a standard codex. It is generally desired that the audio stream be continuous, e.g., without gaps. However, as described herein, the receipt of a late packet can result in a gap, such as Gap 130B, in the audio stream.

In an Accelerate Step 340, a rate at which the audio stream is presented to a user is accelerated in response to the first audio packet being received late. The acceleration optionally includes presenting the audio stream at a greater data rate. For example, the data within the audio stream may be sampled faster than it would be if not accelerated. In alternative embodiments, Accelerate Step 340 includes discarding some of the received audio data and not including the discarded audio data in the audio stream. Ways of selecting which audio data to discard or ignore are discussed elsewhere herein. Accelerate Step 340 is typically performed using Audio Processing Logic 265. The part of the audio stream accelerated optionally includes audio data received within the first data packet, and may include audio data received after the first data packet.

Accelerate Step 340 is optionally performed in incremental steps. For example, the rate at which audio data is presented to the user can be accelerated in several steps and/or gradually. As described elsewhere herein, these steps can less than or equal to, for example, 0.5, 1, 2, 5 or 10 percent. Accelerate Step 340 can include using more than one incremental step to achieve an acceleration that is approximately the sum of each incremental step. The total amount of acceleration achieved in Accelerate Step 340 can be greater than 0.2, 0.5, 1, 2, 3, 5, 10 or 15 percent. The amount of acceleration can be dependent on factors discussed elsewhere herein. If presentation of an audio stream is accelerated by 2 percent 100 milliseconds of audio data will be presented in approximately 98 milliseconds, etc.

In a Present Step 350 the audio stream is presented to the user at an accelerated rate using Audio Output 270. Present Step 350 can be performed concurrently with Accelerate Step 340, e.g., the acceleration and presentation of the data can occur together.

In an optional Decelerate Step 360 the rate at which the audio data is presented to a user is decelerated. This deceleration can result in the audio data being presented at a rate that the audio data was originally configured to be presented, e.g., following deceleration 100 milliseconds of audio data will be presented in 100 milliseconds. As is discussed elsewhere herein, deceleration can be performed in more than one incremental step. In various embodiments incremental deceleration steps can be greater than 0.1, 0.5, 1, 2, 3, 5, 10 or 15 percent. Typically, Decelerate Step 360 is performed when an amount of delay in presentation of the audio data resulting from late packets has been eliminated or reduced to a predetermined level.

Figure 4:
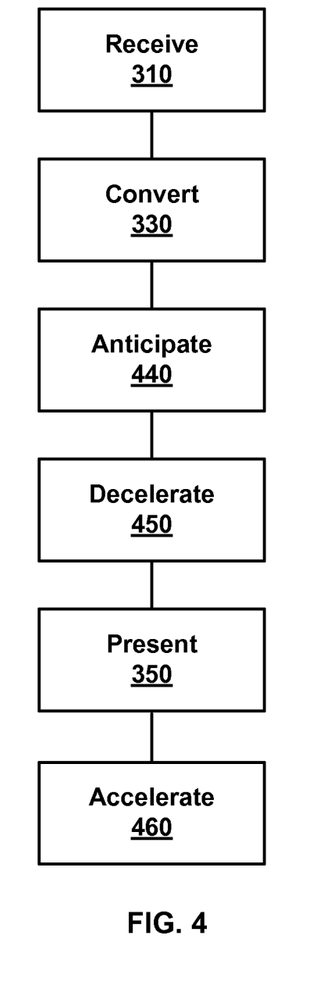
FIG. 4 illustrates methods of compensating for a late packet, according to various embodiments of the invention.

FIG. 4 illustrates methods of compensating for a late packet, according to various embodiments of the invention. The compensation includes decelerating presentation of an audio steam in anticipation that an audio packet will be received late. Deceleration results in the elimination or reduction of a gap, e.g., Gap 130B, in the presentation of the audio stream. If a packet would be late except for compensation performed using a method such as one of those illustrated in FIG. 4, it is still considered late as it still results in an added delay in the presentation of the audio stream to the user. This delay can be accumulated.

The methods illustrated in FIG. 4 include Receive Step 310 and Convert Step 330 as described elsewhere herein. In an Anticipate Step 440, it is anticipated that an audio packet will be received late. The anticipation is based on some indication that the audio packet will be late. For example, an event may or may not have occurred that indicates that there is a greater than average probability that a particular packet will be late. As used herein, the term anticipation is used with respect to a particular audio packet and reflects that the particular audio packet has a greater than average chance of being late. Anticipation is not meant to include the fact that any randomly selected audio packet will have some average chance of being late. The events that can indicate that an audio packet has a greater than average chance of being late include, for example, receiving a packet out of sequence, a number of packets in a receive buffer of Client 220A dropping below a desired level, a predetermined time passing since a last packet has been received, and/or the like. Anticipate Step 440 is optionally performed by Audio Monitoring Logic 255. The audio packet anticipated to be late may or may not actually arrive late.

In a Decelerate Step 450, the rate at which an audio stream is presented to a user is decelerated. The decelerated audio stream is the audio stream that the audio packet that is anticipated to be late is to be included. The deceleration is typically accomplished using Audio Processing Logic 265. The deceleration can be performed in more than one incremental step. In various embodiments incremental deceleration steps can be greater than 0.1, 0.5, 1, 2, 3, 5, 10, 15, 25, 33 or 50 percent. The incremental steps can be performed at least 1, 3, 5, 10, 15, 20 or 33 milliseconds apart. The particular data decelerated may be from an audio packet received before and/or after Anticipate Step 440.

As discussed elsewhere herein, in Present Step 350 the audio stream is presented to a user. In the methods illustrated by FIG. 4 the presentation occurs at the decelerated rate resulting from Decelerate Step 450. The deceleration may eliminate or merely reduce a gap, such as Gap 130B, in the presentation of the audio stream.

In an Accelerate Step 460, the presentation of the audio stream is accelerated. Accelerate Step 460 is an alternative embodiment of Accelerate Step 340 (FIG. 3) and optionally results in the audio stream being accelerated to a rate at which it was originally intended to be presented. Alternatively, Accelerate Step 460 can result in the audio stream being presented at a rate faster than it was intended to be presented. This is desirable when, for example, the audio packet that was anticipated to be late was late and resulted in a delay in the presentation of the audio stream. This may also be desirable when the audio packet was not in fact late, and the deceleration of Decelerate Step 450 has resulted in a delay in the presentation of the audio stream.

Figure 5:
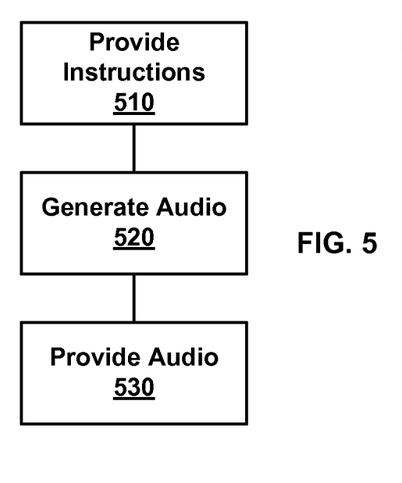
FIG. 5 illustrates methods of communicating audio packets, according to various embodiments of the invention.

FIG. 5 illustrates methods of communicating audio packets, according to various embodiments of the invention. In these methods, computing instructions are provided to Client 220A, audio packets are generated, and the audio packets are provided to Client 220A. The provided computing instructions are configured to process the provided audio packets, for example, using the methods of FIGS. 3 and/or 4. The methods of FIG. 5 may be performed by Audio Server System 210, by a network of Audio Server Systems 210, and/or the like. See, for example, the various systems taught in U.S. patent application Ser. No. 12/826,130 filed Jun. 29, 2010 and entitled "Video Game Overlay," and U.S. patent application Ser. No. 12/826,489 filed Jun. 29, 2010 and entitled "Voice Overlay."

In a Provide Instructions Step 510 computing instructions are provided to Client 220A via Network 215. These instructions are optionally communicated using a network standard such at TCP/IP. The computing instructions can include compiled code, scripts, Java®, XML, HTML, and/or the like. The computing instructions are configured to perform the methods illustrated in FIG. 3 and/or FIG. 4. For example, in some embodiments, the computing instructions are configured to detect that a first audio packet was received late by the client, and to accelerate a rate at which an audio stream is presented to a user based on the first audio packet being received late. In some embodiments, the computing instructions are configured anticipate that a second audio packet will be received late and thereby cause a gap in the audio stream, and/or decelerate a rate at which a first audio packet is presented to a user based on the anticipation that the second audio packet will be late. The computing instructions provided in Provide Instructions Step 510 are optionally further configured to receive a first audio packet via a communication network, to convert the first audio packet to part of the audio stream, and/or to present the audio stream to the user. The computing instructions are optionally provided as part of a web page.

In a Generate Audio Step 520 audio packets are generated using Audio Server System 210. The generation of these audio packets is optionally performed using the systems and methods described in U.S. patent application Ser. No. 12/826,130 filed Jun. 29, 2010 and entitled "Video Game Overlay," and U.S. patent application Ser. No. 12/826,489 filed Jun. 29, 2010 and entitled "Voice Overlay." The audio packets are optionally based on events that occur in, and/or rules of, a video game. The audio packets are typically sequential and configured to be decoded to an audio stream.

In a Provide Audio Step 530 the audio packets generated in Generate Audio Step 520 are provided from Audio Server System 210 to Client 220A via Network 215.

The steps illustrated in FIGS. 3-5 are optionally performed in orders other than those illustrated. These steps are performed using computing devices such as Audio Server System 210 and/or Clients 220.

Several embodiments are specifically illustrated and/or described herein. However, it will be appreciated that modifications and variations are covered by the above teachings and within the scope of the appended claims without departing from the spirit and intended scope thereof. For example, the systems and methods discussed herein may be applied to audio in applications other than video games and telepresence.

Further, while the discussion herein characterizes that acceleration of audio begins when a late packet arrives, in some embodiments, acceleration and deceleration are initiated based on maintaining an optimum buffer fullness. For example, accelerating may be started when there is more than an optimum number of audio packets in an receive buffer of Client 220A and/or deceleration may be started when there is less than an optimum number of audio packets in the receive buffer. There is typically some hysteresis in these limits.

In one embodiment the audio receive buffer is configured to store eight audio packets and a target is set to keep four audio packets in this buffer. When the number of packets in the receive buffer reaches six then acceleration is started and continues until the number of packets in the receive buffer again reaches four. If the number of packets in the receive buffer reaches seven or eight then the acceleration is increased by Audio Monitoring Logic 255. Thus, the rate at which an audio packet is presented to a user is regulated by the number of audio packets in the audio receive buffer. The target number of audio packets in the receive buffer may be set dynamically based on the history of lost packets. For example, if a particular communication channel is relatively unreliable relative to other communication channels, then a larger target number may be used with the particular communication channel relative to the other communication channels.

Accelerating in response to the fullness of a receive buffer is advantageous in systems were the delay of audio packets tends to come in clusters. It is sometimes preferable to have one longer gap in the presentation of audio to a user compared to a series of shorter gaps. The series of shorter gaps can result in an "audio stutter." When a gap in the presentation of audio to the user does occur, the receive buffer is optionally allowed to fill back up to the target number of audio packets before the presentation of audio is resumed.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. An audio system including a processor, comprising:
   an input for receiving audio packets via a communication network;
   the processor executing audio monitoring for anticipating that one of the audio packets will be late;
   the processor executing audio decoding for converting the audio packets to an audio stream;
   the processor executing audio processing for decelerating a rate of part of the audio stream, such that a potential gap in the audio stream resulting from late receipt of one of the audio packets is reduced or eliminated; and
   an audio output for receiving the audio stream at the decelerated rate.

2. The audio system of claim 1, wherein the audio processing is configured to decelerate the rate by reducing a rate at which the audio stream is sampled.

3. A method comprising:
   receiving a first audio packet via a communication network;
   anticipating that a second audio packet will be received late and thereby cause a gap between the first and second audio packet;
   decelerating a rate at which the first audio packet is presented; and
   presenting the first audio packet at the decelerated rate, wherein the method is executed by a processor.

4. The method of claim 3, further comprising accelerating the rate at which the first packet or subsequent packets are presented, after receiving the second audio packet.

5. The method of claim 3, wherein anticipating that the second audio packet will be received late is in response to an audio packet being received out of order, no audio packets being received for a predetermined amount of time, or a number of audio packets in a receive buffer.

6. The method of claim 3, further comprising generating the audio packets.

7. The method of claim 3, wherein the rate is decelerated by sampling the audio data at a lower rate.

8. The method of claim 3, further comprising, accelerating the rate after receiving additional audio packets.

9. The method of claim 3, wherein the computing instructions are configured to decelerate the rate in a stepwise manner.

10. A method comprising:
    receiving audio packets via a communication network;
    anticipating that one or more audio packets will be received late and thereby cause a gap between some of the audio packet;
    decelerating a rate at which the audio packets are presented; and
    accelerating the rate after further receipt of the audio packets determines that packets are arriving on time; and
    continuing to decelerate and accelerate the rate from time to time based on whether the received audio packets indicate late or on time receipt, wherein the method is executed by a processor.

11. The method of claim 10, wherein the rate is decelerated by sampling the audio data at a lower rate.

12. The method of claim 10, wherein anticipating that audio packet will be received late is in response to an audio packet being received out of order, no audio packets being received for a predetermined amount of time, or a number of audio packets in a receive buffer, or a combination thereof.

13. The method of claim 10, wherein the accelerating is defined by discontinuing the deceleration.

* * * * *